(12) United States Patent
Day

(10) Patent No.: US 6,311,274 B1
(45) Date of Patent: Oct. 30, 2001

(54) NETWORK ALERT HANDLING SYSTEM AND METHOD

(75) Inventor: Michael David Day, American Fork, UT (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/990,452

(22) Filed: Dec. 15, 1997

(51) Int. Cl.[7] ................................................. G06F 15/177
(52) U.S. Cl. .................... 713/201; 713/200; 709/224; 714/4; 714/43
(58) Field of Search .................................. 713/200, 201, 713/202; 709/224; 714/4, 43; 380/2, 21, 47; 340/286.02, 825.31, 825.34

(56) References Cited

U.S. PATENT DOCUMENTS

| | | | |
|---|---|---|---|
| 5,440,688 | 8/1995 | Nishida | 714/4 |
| 5,621,892 * | 4/1997 | Cook | 713/201 |
| 5,757,914 * | 5/1998 | McManis | 380/23 |
| 5,781,535 | 7/1998 | Russ et al. | 370/248 |
| 5,872,912 | 2/1999 | Brownmiller et al. | 714/47 |
| 5,931,947 * | 8/1999 | Burns et al. | 713/201 |

* cited by examiner

Primary Examiner—Robert W. Beausoliel, Jr.
Assistant Examiner—James G Weir
(74) Attorney, Agent, or Firm—Kenyon & Kenyon

(57) ABSTRACT

A system and method for alert handling on a network. An alert setup message is received from a originator. The alert data structure includes an alert data structure. If the alert data structure is determined to be authentic, then the alert data structure is processed. If the alert data structure is not determined to be authentic, it can be determined to be invalid. An alert occurrence message that includes an authenticated alert payload is received. If the alert payload is determined to be authentic, then the alert payload is processed. If the alert payload is determined not to be authentic, then the alert payload is determined to be invalid. An authentic alert payload can be processed to cause an alert action to be performed.

34 Claims, 3 Drawing Sheets

NETWORK ALERT HANDLING SYSTEM AND METHOD

FIELD OF THE INVENTION

The present invention pertains to alert handling on a network.

BACKGROUND OF THE INVENTION

Alert handling is an important function of network management wherein, inter alia, the condition of a resource is monitored and an action is taken based upon the nature of (or changes in) the condition. An example of a resource is a network computer. A network computer comprises a processor, memory and a port adapted to be connected to a network, the port and memory being coupled to the processor. Another type of a resource is a device resource. A device resource is an apparatus that is typically adapted to be connected to a network computer. An example of a device resource is a hard disk drive. Another example of a device resource is a microprocessor-controlled thermocouple that is used to control an industrial process.

An alert handling system should be capable of carrying out the following functions: specifying an alert condition (i.e., the condition that triggers an alert action); monitoring the alert condition; sending an alert message when the alert condition is met; and performing an appropriate alert action in response to the alert message.

In certain instances, alert information can be sensitive. For example, revealing under what conditions an alert action is triggered creates a target for an adverse party seeking to manipulate resources that can be affected by the alert handling system. For example, an alert condition specifies that when the network traffic destined for a given subnetwork exceeds a certain threshold, the subnetwork is to be shut down. Revealing this condition could enable an adverse party to shut the subnetwork down at will by flooding the subnetwork with spurious message traffic above the threshold. Also, an adverse party could identify an unintended property of an alert condition or alert action and disadvantageously manipulate resources affected by the alert handling system.

Likewise, an adverse party could masquerade as an alert originator, sending a false alert occurrence message that causes an alert action to be performed spuriously. An unauthorized party could alter the conditions under which an alert action is triggered, possibly disrupting network operations or impairing alert handling. An unauthorized party could also disadvantageously alter the alert action that is triggered when an alert condition is met.

An alert system should provide assurance that the purported source of an alert message is the true source, i.e., that the message is authentic, to prevent an unauthorized party from masquerading as a party authorized to use or manipulate the alert handling system. An alert system should also provide assurance that the contents of any alert message have not been subjected to unauthorized modification. Further, an alert system should protect the confidentiality of sensitive information in alert messages to prevent its unauthorized disclosure.

SUMMARY OF THE INVENTION

According to an embodiment of the present invention, a system and method are provided for alert handling on a network. An alert setup message that includes an alert data structure is received. It is determined if the alert data structure is authentic. If the alert data structure is authentic, then the alert data structure is processed.

DETAILED DESCRIPTION

Figure 1:
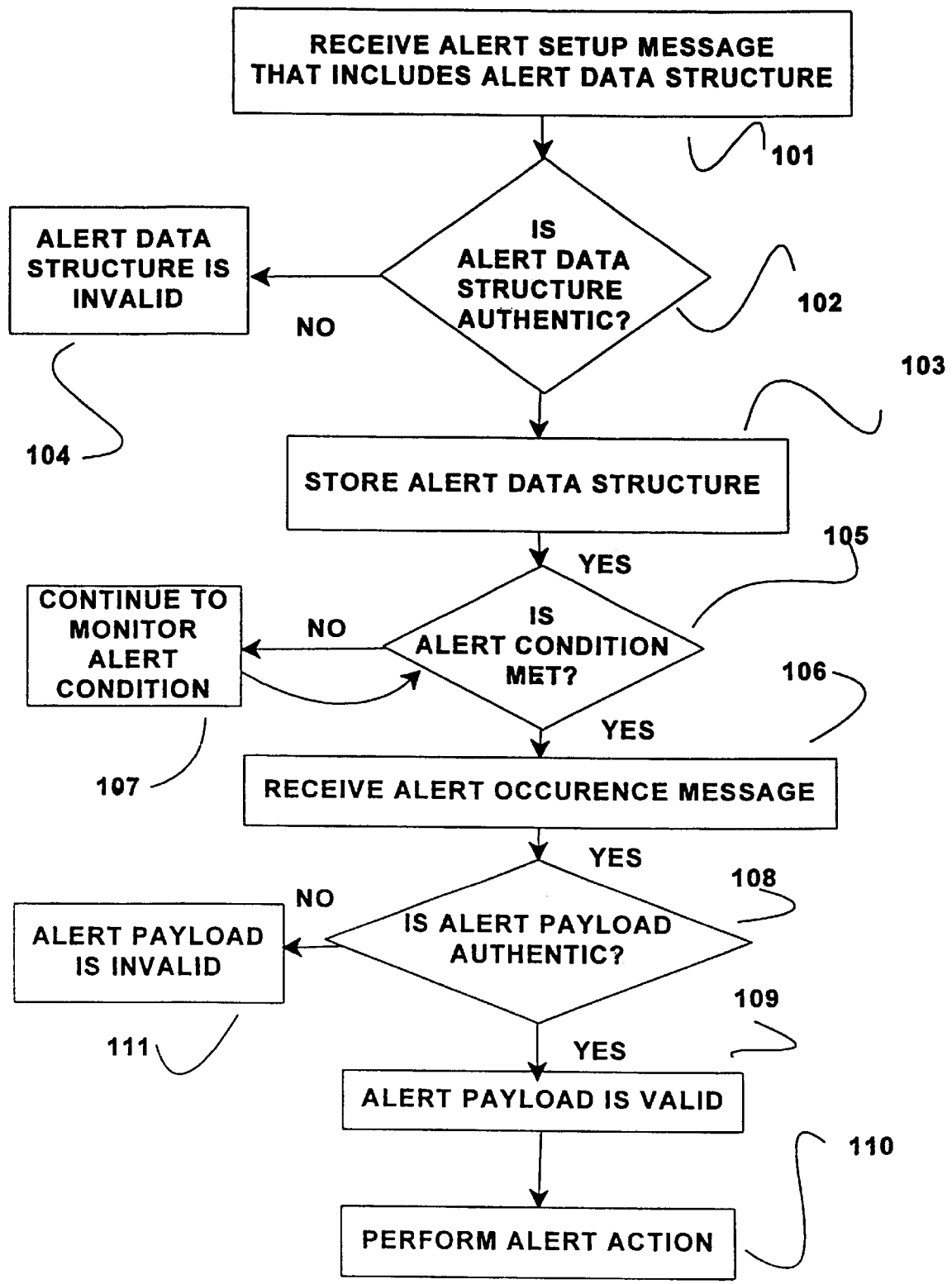
FIG. 1 shows a flow chart showing an embodiment of the present invention.

FIG. 1 is a flow chart showing an embodiment of the present invention. As used herein, the term "an embodiment" or "one embodiment" means at least one embodiment, and does not necessarily refer to a single particular embodiment. As shown in FIG. 1, an alert setup message that includes an alert data structure is received at an alert handler, step 101. An alert handler is an apparatus connected to a network that performs an alert action in response to receiving an alert occurrence message. An alert handler also receives an alert setup message that prescribes the alert action to be performed in response to an alert occurrence message.

In one embodiment of the present invention, the alert setup message is received from an alert originator. An alert originator is an apparatus connected to the network that typically monitors the status of an alert condition, and when the alert condition is met, sends an alert occurrence message to an alert handler. For example, an alert originator monitors the temperature of a memory device and sends an alert occurrence message to an alert handler in the event the temperature exceeds a predetermined threshold.

In another embodiment of the present invention, the alert setup message is received from a configuration originator, which is an apparatus connected to the network. In one embodiment, the alert setup message is composed and sent automatically. In another embodiment, the alert setup message is composed and sent with input from a user. Hereinafter, the originator of the alert setup message is "the originator." The present invention can advantageously receive the alert setup message from different originators connected to the network.

In accordance with an embodiment of the present invention, the alert setup message is comprised of an alert data structure signed by the originator. As used herein, a "signature" (or "authentication information") is any first piece of information that can be used in any way to determine if the purported source of a second piece of information is the true source of the second piece of information. A signature is developed by "signing" the second piece of information. Examples of such a second piece of information include an alert setup message in its entirety; a part of an alert setup message, such as an alert data structure; an acknowledgment message; a nonce (as defined below), etc. This definition can be broader than certain usages of the term "signature" in the art. In the art, the term "signature" may be associated with one or another particular authentication systems. No such limitation is meant here.

An alert data structure describes an alert condition and an alert action that is to be performed when the condition is met. An example of an alert data structure is as follows:

```
alert_struct O

{
    alert_originator = ORIGIN;
    alert_handler = HANDLER;
    alert_identifier = ALERT;
    sensor_temperature = TEMP;
    exceeds_threshold = EXCEED;
    if (exceeds_threshold > 10) then
        {
            send authenticated e-mail to
            sysadmin@uvw.xyz: "Alert! Main memory temperature
            is TEMP; exceeds safety threshold by EXCEED degrees,
            centigrade"
        }
}
```

In this example, the alert condition is met when the exceeds_threshold value is greater than 10. The alert action is to send an e-mail message with the value of TEMP to a given address, sysadmin@uvw.xyz. The variable alert_originator establishes ORIGIN as an identifier of the alert originator. The variable alert_handler establishes HANDLER as the identifier of the alert handler on which the alert data structure is to be stored and implemented. The variable alert_identifier establishes ALERT as the identifier (e.g., the name) of the alert data structure in which it occurs. The variable sensor_temperature establishes TEMP as the temperature of the sensor. The variable exceeds_threshold establishes EXCEED as the amount by which the temperature threshold must at least be exceeded in order to trigger an alert action.

In one embodiment of the present invention, the alert data structure is signed by the originator using a private asymmetric cryptographic key belonging to the originator.

As used herein, a public and private asymmetric cryptographic keys are meant to be used in a public key encryption system. In a public key encryption system, keys occur in corresponding pairs. One key of the pair is kept confidential (the "private key" or "private asymmetric cryptographic key"), while the other key of the pair is shared (the "public key" or "public asymmetric cryptographic key"). If one of the pair of keys is used to encrypt data, only the other of the pair can be used to decrypt the data properly.

A public key encryption system can be used to cryptographically sign data (such as an alert data structure). In one embodiment of the present invention, data is signed by the sender of an alert message using the sender's private key. Cryptographically signing a piece of data produces a cryptographic signature, which is a piece of information that can be sent to a recipient with the piece of data that was signed. The recipient can use the signature to ascertain if a piece of data from which the signature is apparently derived genuinely originates from the sender.

In one embodiment, a signature is produced by generating a message digest from a piece of data, and then encrypting the message digest using a private key at the sender. A message digest functions much like a serial number and uniquely identifies the data from which it is derived. Here, the encrypted message digest is the signature.

When the piece of data and its encrypted message digest are received by a recipient, the recipient uses the same method used by the sender to derive the same message digest from the piece of data. The recipient then uses the sender's public key to decrypt the encrypted message digest (the signature). Only the sender's public key can decrypt the signature properly. If the decrypted signature from the sender is identical to the message digest generated by the recipient, then the signature has been determined to be valid by the recipient, and the recipient is assured that the piece of data originated from the sender. If the decrypted signature is not the same as the message digest generated by the host, then the signature has data that is determined to be invalid by the recipient. Other authentication schemes known in the art can be used in accordance with the present invention.

The alert handler determines if the alert data structure is authentic, step 102. Determining if a piece of information is authentic means evaluating a signature to determine if the piece of information actually originates from its purported source. If the alert data structure is authentic, then the alert handler determines that the alert data structure is valid and stores the alert data structure, step 103. If the alert handler determines that the alert data structure is not authentic, then the alert handler determines that the alert data structure is invalid, step 104. In one embodiment, the alert handler deletes the alert data structure from alert handler memory if the data structure is determined to be invalid. In another embodiment, the receipt of an invalid alert data structure triggers an alert action at the alert handler. For example, if more than three invalid alert data structures are received at the alert handler within any one minute period, the alert handler sends a signed e-mail message to a system administrator indicating that alert handler is being subjected to repeated invalid access attempts.

In accordance with one embodiment of the present invention, the alert originator determines if an alert condition is met, step 105. If an alert condition is met, the alert originator sends a signed alert occurrence message that is received at the alert handler, step 106. The alert occurrence message comprises an alert payload that can be authenticated by the alert handler. The alert payload includes values for variables in the alert data structure. For the alert data structure discussed above, for example, the alert payload has the form:

alert_payload O

```
{
                ORIGIN;
                ALERT;
                TEMP;
                EXCEED;
}.
```

ORIGIN is a value that identifies the alert originator and HANDLER identifies the alert handler. The ALERT value identifies the alert data structure to which the alert payload corresponds. The ORIGIN value identifies the alert originator. The TEMP value identifies the temperature determined from the sensor, and EXCEED identifies the number of degrees by which the TEMP value exceeds a threshold temperature. In one embodiment of the present invention, the alert payload comprises data to be used dynamically by the alert handler in performing an alert action. For example, in one embodiment, the alert payload may include the e-mail address of the recipient of an alert action e-mail. In another embodiment, the alert data structure specifies three alternative alert actions, each with a different identifier. The alert payload may include an alert action selection value that specifies the identifier of the alert action to be performed in response to the alert occurrence message.

If the temperature of a memory monitored by an alert originator reaches 140 degrees, and if the safe temperature threshold has been established at 110 degrees, then an example of an alert payload is:

(wizard3,MEMTEMP,140,30)

This payload indicates that the alert message originates from a computer denoted wizard3, pertains to an alert data structure called MEMTEMP, and that the temperature derived from the sensor is 140 degrees, 30 degrees higher than the threshold safety temperature.

In one embodiment of the present invention, the alert payload is signed at the alert originator with a private asymmetric cryptographic key belonging to the alert originator.

If the alert condition is not met, the alert originator continues to monitor the alert condition, step 107.

When an alert occurrence message is received at an alert handler, the alert handler determines if the alert payload is authentic in known fashion, step 108.

If the alert payload is authentic, the alert handler determines that the alert occurrence message is valid, step 109, and performs the alert action specified in the alert data structure, step 110. If the alert handler determines that the alert payload is not authentic, then the alert handler determines that the alert occurrence message is invalid, step 111. In one embodiment of the present invention, the alert handler deletes the alert occurrence message from the alert handler memory when it is determined to be invalid. In another embodiment, the receipt of an invalid alert occurrence message triggers a second alert action at the alert handler. The second alert action is distinct from the alert action that is performed when an authentic valid alert payload is received. For example, a second alert action is the sending of a message to a pager belonging to a system administrator indicating that a false alert payload has been received by the alert handler.

In accordance with the present invention, an alert action comprises, inter alia, sending an e-mail message, sending a message to a pager, sending instructions adapted to be executed by a processor to an apparatus connected to the network, making a telephone call, or any combination thereof. Other alert actions include submitting a trouble ticket to a help desk; logging the alert to a hypertext page on a server on the World Wide Web; distributing software; and initiating a transaction to order a replacement part. Certain alert actions involve sending information to a "recipient." A "recipient" is any entity meant to receive such information. Examples of a recipient include a peer, a host, a client computer, a person, a telephone, etc. In the above example, the alert handler sends an e-mail that includes TEMP, the value of the temperature obtained from the sensor. In one embodiment, the alert handler authenticates the e-mail before sending it to its destination. In one embodiment, the e-mail is signed by the alert handler using a private asymmetric cryptographic key belonging to the alert handler. In one embodiment, the alert handler signs at least a part of the information it sends in performing an alert action. In another embodiment, the alert handler encrypts at least a part of the information it sends in performing an alert action.

In another embodiment of the present invention, an acknowledgment message is sent from the recipient of an alert setup or alert occurrence message to the originator of the message. The acknowledgment message comprises signed acknowledgment data. In one embodiment, acknowledgment data includes information pertaining to the status of the alert message recipient. In one embodiment, the acknowledgment data indicates that the message has been received and determined to be authentic. In another embodiment, the acknowledgment data indicates that the recipient is presently unavailable to process the alert message.

In one embodiment of the present invention, the acknowledgment message is sent to the originator only if the recipient determines that the alert data structure or alert payload is authentic. In another embodiment, an alert handler sends an acknowledgment message to an originator of an alert occurrence message after an alert action is performed.

One embodiment of the present invention advantageously defeats replay attacks by including a nonce in a message. A nonce is a data element that for practical purposes is used only once in any given context. In one embodiment of the present invention, a nonce is a random number. A replay attack occurs when an unauthorized party records an alert message and replays it later (e.g., sends it to a recipient), complete with its original authentication information. The recipient determines that the replayed message is authentic and erroneously determines that it is valid. As used herein, the term "alert message" means an alert setup message, an alert occurrence message, or an acknowledgment message.

In accordance with one embodiment of the present invention, a recipient of a present alert message determines if the notice has been previously received in another alert message of the same type (e.g., alert setup message, alert occurrence message.) If the nonce has been previously received in another message of the same type, then the present alert message is determined to be invalid. If the nonce is determined not to have been previously received in another message of the same type, and if at least part of the present message is authentic (including the nonce), then the present message is determined to be valid. This advantageously defeats replay attacks by rendering otherwise identical messages sent at different times distinct and usable only once.

In one embodiment of the present invention, a nonce is reused in different type messages, or with such infrequency that the nonce is practically used only once. For example, in certain environments, a nonce that is used no more frequently than once every five years is for practical purposes used only once. However, reusing a nonce can under certain circumstances diminish the protection against replay attacks provided by using nonces. In accordance with the present invention, a signed nonce can be included in any alert message.

In another embodiment of the present invention, at least part of an alert message is encrypted. This is advantageous in preventing the unauthorized disclosure of alert messages whose contents are confidential, or revealing system information through open or covert channels. In accordance with one embodiment of the present invention, a first symmetric cryptographic key is used to encrypt at least part of an alert message. The first symmetric key is then encrypted by a sender of a message using a public asymmetric key belonging to the intended recipient of the message. The encrypted first symmetric key and the encrypted part of the alert message are sent from the sender to the intended recipient.

In another embodiment, a second symmetric key is used to encrypt at least part of the alert message at the sender. This second symmetric key must be shared between the sender and the recipient.

Figure 2:
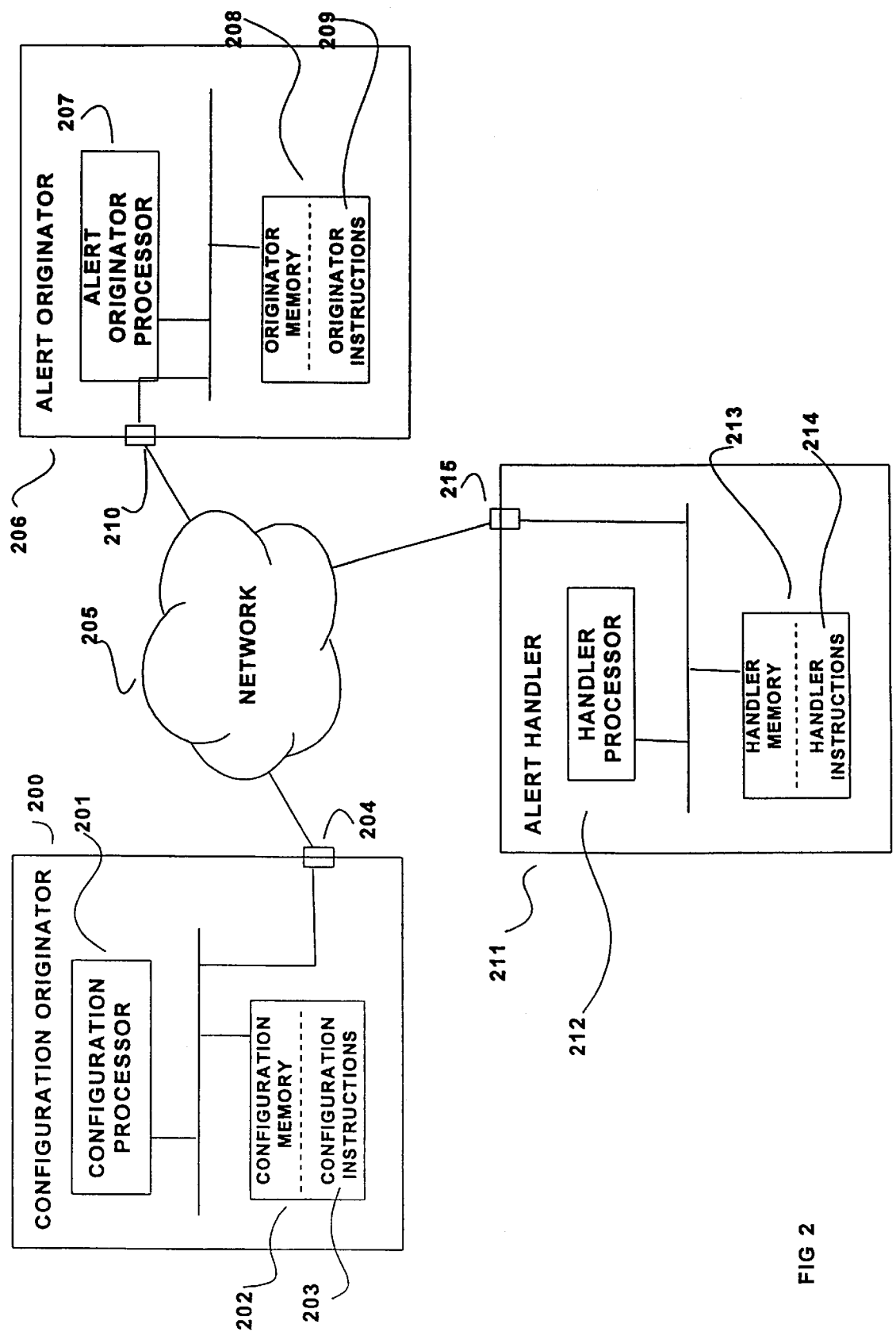
FIG. 2 shows an embodiment of an apparatus and system in accordance with the present invention.

An embodiment of the present invention that shows how the functions of the present invention can advantageously be distributed over several different platforms is shown in FIG. 2. Configuration originator 200 comprises a configuration processor 201 and a configuration memory 202 that stores configuration instructions 203 adapted to be executed by processor 201 to sign and send alert setup messages through port 204, which is adapted to be coupled to network 205.

Configuration memory 202 and port 204 are coupled to configuration processor 201.

Alert originator 206 comprises an alert originator processor 207 and an alert originator memory 208 that stores instructions 209 adapted to be executed by alert originator processor 207 to sign and send an alert occurrence message. Instructions 209 can also be adapted to be executed by alert originator processor 207 to monitor an alert condition. The alert occurrence message is sent through port 210, which is adapted to be coupled to network 205. Memory 208 and port 210 are coupled to processor 207.

Alert handler 211 comprises a handler processor 212, a handler memory 213 that stores a set of handler instructions 214 that are adapted to be executed by the handler processor 212 to receive and determine the authenticity of an alert setup message from configuration originator 200; to receive and determine the authenticity of an alert occurrence message from alert originator 206; and to perform an alert action. Instructions 214 can also be adapted to be executed by processor 212 to store an alert data structure in memory 213. Alert handler 213 further comprises a port 215 adapted to be coupled to network 205, and through which alert setup and alert occurrence messages are received, and through which alert actions can be performed. Memory 213 and port 215 are coupled to processor 214.

Figure 3:
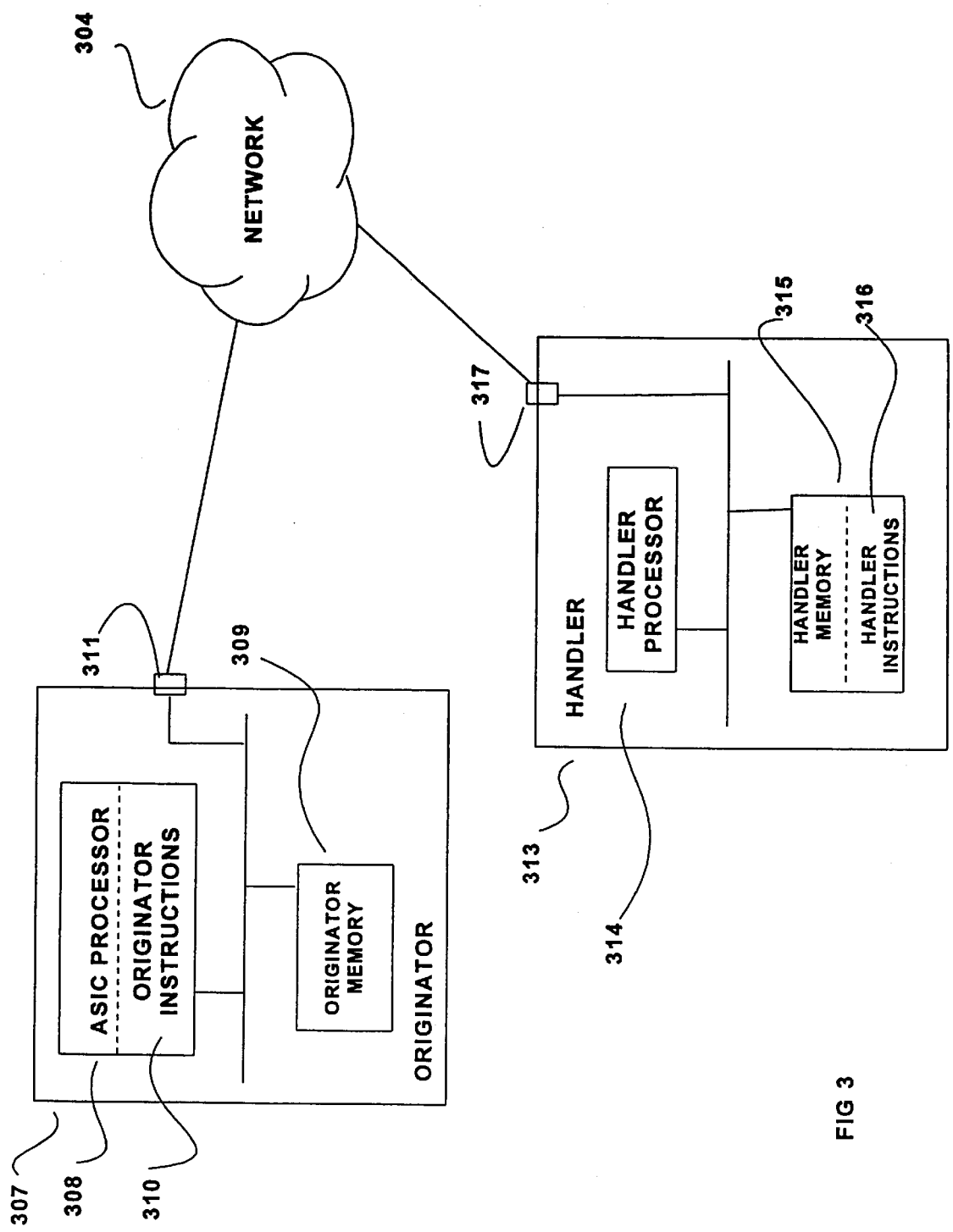
FIG. 3 shows another embodiment of an apparatus and system in accordance with the present invention.

Another embodiment of the present invention where a single originator apparatus performs the functions of both the configuration originator and the alert originator of FIG. 2 is shown in FIG. 3. An originator 307 comprises Application Specific Integrated Circuit (ASIC) 308, a port 311 to be connected to a network 304 and memory 309. Port 311 and memory 309 are coupled to ASIC 307. ASIC 307 embodies an electronically fixed set of instructions 310 that are adapted to be executed by ASIC 307 to sign and send an alert setup message and an alert occurrence message.

Handler 313 comprises a handler processor 314 and handler memory 315 that stores handler instructions 316 adapted to receive and determine the authenticity of alert setup and alert occurrence messages from originator 307. Instructions 316 can also be adapted to be executed on processor 314 to store an alert data structure in memory 315. A port 317 adapted to be coupled to network 304 and memory 315 are coupled to processor 314.

Any of the instructions stored in the memories shown in FIGS. 2 and 3 can be adapted to be executed on their respective processors to encrypt and decrypt any message, and to send and receive acknowledgment messages in accordance with the present invention. Any of the memories shown in FIGS. 2 and 3 can store cryptographic keys.

In accordance with an embodiment of the present invention, the functions of specifying an alert data structure, monitoring an alert condition, sending an alert occurrence message, and performing an alert action can advantageously be divided and distributed among separate resources connected to the network. Alternatively, one or more of these functions can be performed by a single resource connected to the network. In one embodiment of the present invention, a first alert data structure is sent from a configuration originator to an alert originator. The alert originator processes the first alert data structure to obtain a second alert data structure. The alert originator sends the second alert data structure to an alert handler, which stores the alert data structure. The alert originator monitors an alert condition. When the alert condition is met, the alert originator sends an alert occurrence message to the alert handler. The alert handler processes the alert occurrence message and performs an alert action.

In another embodiment of the present invention, an alert data structure is provided to a first alert handler by a user through a keyboard. The alert handler stores the alert data structure. Thus, the alert handler performs the same function as a configuration originator in certain other embodiments. An alert originator monitors an alert condition. When the alert condition is met, the alert originator sends an alert occurrence message to the first alert handler. In one embodiment, a temporarily unavailable first alert handler sends a message to the alert originator indicating that it is presently unavailable to perform the appropriate alert action. The alert originator re-sends the alert occurrence message to a second alert handler which performs an appropriate alert action.

One embodiment of the present invention advantageously provides a system and method for handling alerts that advantageously determines the authenticity of alert messages, precludes replay attacks, and protects the integrity and confidentiality of alert messages.

Certain embodiments of the present invention provide authentication and/or encryption for certain alert messages, and not for others. Such embodiments can advantageously be deployed in environments where certain links and/or resources are especially vulnerable to security threats, while others are in relatively secure environments and are less vulnerable.

Although several embodiments are specifically illustrated and described herein, it will be appreciated that modifications and variations of the present invention are covered by the above teachings and within the purview of the appended claims without departing from the spirit and intended scope of the invention. For example, the present invention can be implemented without authentication. Embodiments of the present invention that do not uniformly include authentication can advantageously be implemented in environments with heterogeneous security properties, or in environments where security is not an issue.

What is claimed is:

1. A method for alert handling on a network including:
   a. receiving an alert setup message that includes an alert data structure that prescribes an alert action to be performed in response to an alert occurrence message;
   b. determining if the alert data structure is authentic; and
   c. if the alert data structure is authentic, then processing the alert data structure.

2. The method of claim 1, wherein processing the alert data structure includes storing the alert data structure.

3. The method of claim 1, wherein the originator is an alert originator.

4. The method of claim 1, wherein the originator is a configuration originator.

5. The method of claim 1, wherein the alert setup message is received by an alert handler.

6. The method of claim 1, wherein the alert setup message includes a signature.

7. The method of claim 1, wherein the alert setup message includes a first nonce, and wherein processing the alert data structure includes:
   i. determining if the first nonce has been previously received in another alert setup message; and
   ii. if the first nonce has been previously received in another alert setup message, then determining that the alert data structure is invalid.

8. The method of claim 1, wherein at least part of the alert setup message is encrypted.

9. The method of claim 1, wherein the alert setup message includes a first nonce, and wherein processing the alert data structure includes:

d. if the first nonce is authentic, then determining if the first nonce has been previously received in another alert setup message; and e. if the first nonce is not authentic or if the first nonce has been previously received in another alert setup message, then determining that the alert data structure is invalid.

10. The method of claim 1, wherein the alert setup message further includes a cryptographic key.

11. The method of claim 1, further including:

d. if the alert data structure is authentic, then sending an acknowledgment message to the originator.

12. A method for alert handling on a network including:

a. receiving an alert occurrence message that includes an alert payload message from an alert originator;

b. determining if the alert payload is authentic; and c. if the alert payload is authentic, then processing the alert payload.

13. The method of claim 12, wherein processing the alert payload includes performing an alert action.

14. The method of claim 12, wherein the alert occurrence message includes a signature.

15. The method of claim 12, wherein the alert occurrence message includes a second nonce, and wherein processing the alert occurrence message includes:

i. determining if the second nonce has been previously received in another alert occurrence message; and ii. if the second nonce has been previously received in another alert occurrence message, then determining that the alert occurrence message is invalid.

16. The method of claim 12, wherein at least part of the alert occurrence message is encrypted.

17. The method of claim 12, wherein the alert occurrence message includes a cryptographic key.

18. The method of claim 12, further including:

d. if the alert occurrence message is authentic, then sending an acknowledgment message to the alert originator.

19. The method of claim 13, wherein performing an alert action includes sending a signature to a recipient.

20. The method of claim 13, wherein performing an alert action includes sending information, at least part of which is encrypted, to a recipient.

21. The method of claim 13, wherein performing an alert action includes sending an e-mail message to at least one e-mail recipient connected to the network.

22. The method of claim 13, wherein performing an alert action includes sending a facsimile to at least one recipient.

23. The method of claim 13, wherein performing an alert action includes sending instructions adapted to be executed by a processor to at least one processor.

24. The method of claim 13, wherein performing an alert action includes sending a message to an electronic pager.

25. The method of claim 13, wherein performing an alert action includes making a telephone call.

26. The method of claim 13, wherein an acknowledgment message is sent to a recipient after performing the alert action.

27. An apparatus for alert handling on a network, comprising:

a. a processor;

b. a memory that stores instructions adapted to be executed by said processor to determine the authenticity of, send and receive alert messages; and c. a port though which alert messages are sent and received, said port adapted to be coupled to the network, and said port and said memory coupled to said processor.

28. The apparatus of claim 27, wherein said instructions are further adapted to be executed by said processor to encrypt and decrypt at least a part of an alert message.

29. The apparatus of claim 27, wherein said instructions are further adapted to be executed by said processor to perform an alert action.

30. The apparatus of claim 27, wherein said instructions are further adapted to be executed by said processor to sign an alert message.

31. A medium storing instructions adapted to be executed by a processor to:

a. receive a first alert message;

b. determine if at least part of the first alert message is authentic; and c. send a second alert message.

32. The medium of claim 31, said instructions being further adapted to be executed by a processor to encrypt and decrypt at least part of an alert message.

33. The medium of claim 31, said instructions being further adapted to be executed by a processor to perform an alert action.

34. The medium of claim 31, said instructions being further adapted to be executed by a processor to sign an alert message.

* * * * *

UNITED STATES PATENT AND TRADEMARK OFFICE
CERTIFICATE OF CORRECTION

PATENT NO. : 6,311,274 B1
DATED : October 30, 2001
INVENTOR(S) : Michael David Day It is certified that error appears in the above-identified patent and that said Letters Patent is hereby corrected as shown below:

Column 6,
Line 22, replace "notice" with -- nonce --.

Signed and Sealed this

Twenty-eighth Day of January, 2003

JAMES E. ROGAN
*Director of the United States Patent and Trademark Office*